United States Patent
Smits et al.

(10) Patent No.: US 8,314,164 B2
(45) Date of Patent: Nov. 20, 2012

(54) FILLED RUBBER COMPOSITIONS

(75) Inventors: Valerie Smits, Lobbes (BE); Michael Backer, Marbais (Br.W.) (BE); Sebastien Grofils, Porcheresse (Lux.) (BE); Thierry Materne, Chaumont Gistoux (BE); Laurence Stelandre, Marcq en Baroeul (FR); Randall Schmidt, Midland, MI (US); Steven Swier, Midland, MI (US); Thomas Chaussee, Nord (FR)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 12/745,213

(22) PCT Filed: Nov. 28, 2008

(86) PCT No.: PCT/EP2008/066422
§ 371 (c)(1),
(2), (4) Date: Nov. 10, 2010

(87) PCT Pub. No.: WO2009/068643
PCT Pub. Date: Jun. 4, 2009

(65) Prior Publication Data
US 2011/0046272 A1    Feb. 24, 2011

Related U.S. Application Data

(60) Provisional application No. 61/053,299, filed on May 15, 2008, provisional application No. 61/100,776, filed on Sep. 29, 2008.

(30) Foreign Application Priority Data

Nov. 29, 2007  (GB) .................................. 0723384.4

(51) Int. Cl.
*C08L 1/02* (2006.01)
*C08K 3/34* (2006.01)

(52) U.S. Cl. .............. 524/35; 524/80; 524/52; 524/426; 524/430; 524/451

(58) Field of Classification Search .................... 524/35, 524/80, 52, 426, 430, 451
See application file for complete search history.

(56) References Cited

U.S. PATENT DOCUMENTS

| 3,978,103 | A | 8/1976 | Meyer-Simon et al. |
| 5,468,893 | A | 11/1995 | Parker et al. |
| 5,684,171 | A | 11/1997 | Wideman et al. |
| 5,852,099 | A | 12/1998 | Vanel |
| 6,465,544 | B1 | 10/2002 | Bomal et al. |
| 6,472,481 | B1 | 10/2002 | Luginsland et al. |
| 6,774,255 | B1 | 8/2004 | Tardivat et al. |
| 2006/0217473 | A1 | 9/2006 | Hergenrother et al. |

FOREIGN PATENT DOCUMENTS

| EP | 0735088 A1 | 10/1996 |
| EP | 1 092 749 A2 * | 4/2001 |
| EP | 1092749 A2 | 4/2001 |
| GB | 1538256 A | 1/1979 |
| JP | 11181159 A | 7/1999 |
| JP | 2001192454 A | 7/2001 |
| WO | WO 2004005395 A2 | 1/2004 |
| WO | WO 2006027618 A1 | 3/2006 |
| WO | WO 2007061550 A1 | 5/2007 |

OTHER PUBLICATIONS

English language abstract for EP 0735088 extracted from espacenet.com database, dated Aug. 24, 2010, 13 pages.
English language translation and abstract for JP 11-181159 extracted from PAJ database, dated Aug. 24, 2010, 36 pages.
English language translation and abstract for JP 2001-192454 extracted from PAJ database, dated Aug. 24, 2010, 47 pages.
PCT International Search Report for PCT/EP2008/066422, dated Mar. 25, 2009, 3 pages.

* cited by examiner

*Primary Examiner* — Robert D. Harlan
(74) *Attorney, Agent, or Firm* — Howard & Howard Attorneys PLLC

(57) ABSTRACT

The present invention relates to a curable rubber composition comprising an organic elastomer, a filler and at least one curing agent for the elastomer. Such curable rubber compositions are widely used in the production of cured rubber articles, such as tires, belts and hoses. The composition contains a branched silicone resin having Si-bonded hydroxyl groups or azo groups. This may lead to a reduction in the mixing energy required for processing, particularly in the energy required in the first (non-productive) mixing phase to give good dispersion of the filler in the organic elastomer. Use of the branched silicone resin can also accelerate cure (vulcanization), thus reducing the required cure time or reducing the amount of cure accelerator required.

14 Claims, No Drawings

FILLED RUBBER COMPOSITIONS

RELATED APPLICATIONS

This application claims priority to and all the advantages of International Patent Application No. PCT/EP2008/066422, filed on Nov. 28, 2008, which claims priority to Great Britain Patent Application No. GB0723384.4, filed on Nov. 29, 2007, U.S. Provisional Patent Application No. 61/053,299, filed on May 15, 2008, and U.S. Provisional Patent Application No. 61/100,776, filed on Sep. 29, 2008.

This invention relates to filled curable rubber compositions. In particular it relates to curable rubber compositions comprising an organic elastomer, a filler containing hydroxyl groups and at least one curing agent for the elastomer. By an organic elastomer we mean an elastomer based on carbon chemistry, that is an elastomeric polymer in which at least half the atoms in the polymer backbone are carbon atoms. Such curable rubber compositions are widely used in the production of cured rubber articles, such as tyres, belts and hoses.

When producing rubber compositions, it is desirable that the compositions should be easily processable and require a low mixing energy, while producing cured rubber products having good physical properties such as hardness, tensile modulus and viscoelastic properties. Mixing a filler containing hydroxyl groups such as silica into an organic elastomer composition can be difficult. Various coupling agents have been used to improve the dispersion of the hydroxyl-containing filler in the rubber composition, for example sulfidosilanes as described in U.S. Pat. No. 3,978,103 and U.S. Pat. No. 5,468,893. There is however a wish in the rubber industry for further additives, used instead of or in addition to such coupling agents, to improve the processability and physical properties of curable rubber compositions filled with a filler containing hydroxyl groups.

US-A-2006-0217473 describes the use of alkoxy-modified silsesquioxane compounds as dispersing agents in vulcanisable elastomeric compositions containing silica as a reinforcing filler.

WO-A-2006-027618 describes the inclusion of a polyhedral oligomeric silsesquioxane in a rubber compound masterbatch used for the manufacture of tyres.

According to JP 11-1181159 (Yokohama), a specific alkoxysilane component is subjected to two-stage hydrolysis and condensation to give a ladder-type polysiloxane having silanol groups and an average molecular weight of 500-20,000.

WO-A-2004-005395 describes increasing the hardness of silica rubber mixtures by blending with at least one silane and a silicone resin of the MQ type.

Example 1 of EP 1 092 749 A2 describes a rubber compounding ingredient containing a branched organoxy group-containing polysiloxane made of 25 mol % MethylSiO$_{3/2}$ units, 60 mol % Methyl MethoxySiO$_{2/2}$ units, and 15 mol % Methyl (Methoxy)$_2$SiO$_{2/2}$ units.

JP 2001-192454 describes an organopolysiloxane compounding agent for rubber, which can contain alkoxy groups and sulfide groups.

U.S. Pat. No. 6,472,481 describes sulphur-functional organopolysiloxane that can be used in rubber mixtures.

A curable rubber composition according to the invention comprises an organic elastomer, a filler and at least one curing agent for the elastomer, and is characterised in that the composition contains a branched silicone resin having Si-bonded hydroxyl group or azo groups.

The branched silicone resin has Si-bonded hydroxyl groups or azo groups. A branched silicone resin having an azo group contains a —N═N— linkage. Preferred azo groups are those containing an azodicarbonyl linkage of the form —C(O)—N═N—C(O)—. The azo group can thus be of the formula —Z—C(O)—N═N—C(O)—Z'—Y in which Z and Z' each independently represent an amino group, an oxygen atom or a substituted or unsubstituted methylene group, and Y represents a substituted or unsubstituted alkyl or aryl group. One example of such an azo group is an ethylcarbazocarbamoylpropyl group of the formula —(CH$_2$)$_3$—NH—C(O)—N═N—C(O)—O—C$_2$H$_5$. The group Y can advantageously be substituted by a silane group or so that the azo group can be a linkage joining two branched silicone resin moieties. Preferably, the branched silicone resin has a Si-bonded hydroxyl group: it contains a direct Si—OH linkage, this is a silanol function. This contrasts with indirect linkage between OH and Si such as obtained when an alkoxy substituent on the silicon atom bears a hydroxyl group i.e. a Si—O-alkyl-OH linkage.

We have found that use of a branched silicone resin in the rubber composition according to the invention may lead to a reduction in the mixing energy required for processing, particularly in the energy required in the first (non-productive) mixing phase to give good dispersion of the filler in the organic elastomer. Use of the branched silicone resin can also accelerate cure (vulcanization), thus reducing the required cure time or reducing the amount of cure accelerator required. Use of branched silicone resins containing silanol groups also has the advantage of reducing the level of volatile organic compounds released during processing and curing compared to resins containing Si-bonded alkoxy groups as described in US-A-2006/0217473.

Use of a branched silicone resin in the rubber composition according to the invention can also lead to cured rubber products having increased hardness and increased tensile modulus, and having modified viscoelastic properties as shown in thermo-mechanical analysis by a dissipation peak around the glass transition temperature and the rubbery and glassy modulus. For some uses a rubber composition with these advantages is required.

Rubber composition, such as tyre treads, contain a certain amount of reinforcing filler, such as silica or carbon black to improve various physical properties such as the Mooney viscosity, modulus (M100, M300), and the like but the presence of a filler can be detrimental to other properties for example the rolling resistance (tan delta max).

The silicone resin according to the invention can be used to give the same hardness and tensile modulus at lower levels of reinforcing filler. For example a hydroxyl-containing branched silicone resin can be used as a partial replacement for the reinforcing filler such as silica, with the amount of resin added being less than the amount of filler it replaces. The filler weight and hence the specific gravity of the rubber composition can be reduced. The Payne effect, which is a non-linearity in Young's modulus (stress to strain) as measured at different strain levels, is decreased by this partial filler replacement by silicone resin in the rubber composition. Reduction of the Payne effect generally indicates that the rolling resistance of a tyre tread made from the composition will be lower at the same wet traction or wet grip performance.

The invention permits thus to achieve lower rolling resistance while keeping other properties, for example physical properties linked to lifetime, such as M100 and M300 at a similar level. This is surprising given that according to known techniques, polysiloxane compounds were known as silane replacement not as filler replacement.

According to one aspect of the present invention, a branched silicone resin containing Si-bonded hydroxyl groups is used in a curable rubber composition comprising an organic elastomer filled with a filler containing hydroxyl groups to reduce the mixing energy required for processing the rubber composition and/or to improve the performance properties of products formed by curing the rubber composition. Use of the branched silicone resin containing Si-bonded hydroxyl groups can also reduce the amount of the expensive auxiliary curing agents required to vulcanize the rubber composition, thus reducing the cost of the composition.

According to another aspect of the present invention a branched silicone resin containing azo groups is used in a curable filled natural rubber composition to reduce the mixing energy required for processing the rubber composition and/or to improve the performance properties of products formed by curing the rubber composition.

According to a further aspect of the present invention a branched silicone resin containing Si-bonded hydroxyl groups and polysulfide groups is used in a filled curable organic elastomer composition to reduce the mixing energy required for processing the rubber composition and/or to improve the performance properties of products formed by curing the rubber composition. A branched silicon resin having polysulfide group contains a linkage —$S_a$— where a has a value of 2 to 10

The branched silicone resin is a resinous polymeric material comprising branching units selected from $RSiO_{3/2}$ (also known as T units) and/or $SiO_{4/2}$ units (also known as Q units), in which the groups R, which can be different in different siloxane units, are selected from hydroxyl, hydrocarbon, substituted hydrocarbon, hydrocarbonoxy and substituted hydrocarbonoxy groups. The branched silicone resin optionally also comprises $R_2SiO_{2/2}$ units (D units) and/or $R_3SiO_{1/2}$ units (M units), in which each R is defined as above. The hydrocarbon and hydrocarbonoxy groups each preferably contain 1 to 20, more preferably 1 to 8, carbon atoms. The branched silicone resin is 3-dimensional. It is distinguished from a 2-dimensional "ladder" structure. It is distinguished from a 3-dimensional polyhedral oligomeric silsesquioxane by being amorphous whereas the polyhedral oligomeric silsesquioxane is crystalline. The branched silicone resin consists of various polymer molecules of differing numbers of siloxane units. Differences in structure can strongly influence the properties of the compound as will be apparent from the results of comparative examples shown later in the present description.

The branched silicone resin is preferably a T-resin in which the majority of the siloxane units are T units. More preferably, at least 80 or 90% of the siloxane units in the T-resin are T units. Such T-resins can readily be prepared by hydrolysis and condensation of trichlorosilanes and separated from the reaction mixture by transferring to an organic phase from an aqueous phase. The T-resins can alternatively be prepared by hydrolysis and condensation of trialkoxysilanes such as triethoxysilanes. The T-resins are more readily available and less expensive than polyhedral oligomeric silsesquioxanes, which have to be prepared slowly in dilute conditions favouring intramolecular condensation over intermolecular condensation.

The branched silicone resin can for example comprise units of the formula $R'SiO_{3/2}$, in which each R' represents an alkyl or substituted alkyl group, and units of the formula $HOR'SiO_{2/2}$. Examples of preferred alkyl groups R' include methyl, ethyl, n-propyl, isopropyl, n-butyl, isobutyl, hexyl, cyclohexyl, 2-ethylhexyl and octyl. Examples of substituted alkyl groups are any of the above alkyl groups substituted by one or more halogen atoms or hydroxyl groups or by a reactive group. The reactive group can for example be an ethylenically unsaturated group such as vinyl or methacryloyl, an epoxy group such as glycidyl, a mercapto group (also known as a thiol group), a blocked mercapto group such as an octanoylthio group, a sulfide linkage, a hydroxyl group or an amino, amido or imido group such as a maleimido group. The branched silicone resin can also contain Si-bonded alkoxy groups, although it is preferred that the molar ratio of silanol groups to Si-bonded alkoxy groups is greater than 1:1.

The T-resin can alternatively or additionally comprise units of the formula $R''SiO_{3/2}$, in which each R'' represents an aryl group, and units of the formula $HOR''SiO_{2/2}$. Examples of aryl groups R'' are phenyl, tolyl and naphthyl groups. Some or all of the aryl groups can be substituted, for example by a reactive group as described above with reference to substituted alkyl groups.

The substituted alkyl groups R' can alternatively or additionally comprise polysulfide groups, that is groups containing a linkage —$S_a$— where a has a value of 2 to 10. The polysulfide group can for example be a —R*—$S_a$—R*—$SiX_3$ group forming a polysulfide linkage, wherein each R* represents an alkylene linkage having 1 to 18 carbon atoms, each X represents a hydroxyl, hydrocarbon, substituted hydrocarbon, hydrocarbonoxy or substituted hydrocarbonoxy group or an $O_{1/2}$ linkage, and a has an average value of 2 to 10. Thus in one preferred branched silicone resin the majority of the siloxane units in the branched silicone resin are T units of the form $RSiO_{3/2}$, in which the groups R, which can be different in different siloxane units, are selected from hydroxyl, hydrocarbon, substituted hydrocarbon, hydrocarbonoxy and substituted hydrocarbonoxy groups, and the branched silicone resin comprises units of the formula $R'SiO_{3/2}$ in which R' represents a substituted alkyl group containing a —R*—$S_a$—R*—$SiX_3$ group as defined above. It is particularly preferred that at least one, more preferably two or three, X in the $SiX_3$ group represents an $O_{1/2}$ linkage, so that the polysulfide group is a linkage between two branched silicone resin moieties.

The branched silicone resins containing polysulfide groups or linkages improve the bonding between fillers, particularly silica, and rubbers, particularly synthetic diene rubbers. This can reduce the mixing energy required for processing the rubber composition and/or improve the performance properties of products formed by curing the rubber composition. Branched silicone resins containing polysulfide groups or linkages can wholly or partly replace the sulfidosilane coupling agent conventionally used in silica-filled rubber compositions. The branched silicone resin containing polysulfide groups or linkages may also aid vulcanization of the rubber, reducing the amount of the expensive auxiliary curing agents required in the rubber composition The branched silicone resin containing polysulfide groups or linkages may or may not additionally contain Si-bonded hydroxyl groups.

The substituted alkyl groups R' can alternatively or additionally comprise azo groups. By an azo group we mean any group containing a N=N linkage. Preferred azo groups are those containing an azodicarbonyl linkage of the form —C(O)—N=N—C(O)—, The azo group can thus be of the formula —Z—C(O)—N=N—C(O)—Z'—Y in which Z and Z' each independently represent an amino group, an oxygen atom or a substituted or unsubstituted methylene group, and Y represents a substituted or unsubstituted alkyl or aryl group. One example of such an azo group is an ethylcarbazocarbamoylpropyl group of the formula —(CH$_2$)$_3$—NH—C(O)—N=N—C(O)—O—C$_2$H$_5$. The group Y can advantageously be substituted by a silane group or particularly T units of the form RSiO$_{3/2}$ so that the azo group can be a linkage joining two branched silicone resin moieties.

The preparation of trialkoxysilanes containing an azo group is described in GB-A-1538256. Branched silicone resins containing azo groups can be prepared by hydrolysis and condensation of such trialkoxysilanes.

Branched silicone resins containing azo groups improve the bonding between fillers, particularly silica, and natural rubber. This can reduce the mixing energy required for processing the rubber composition and/or improve the performance properties of products formed by curing the rubber composition. The branched silicone resin containing azo groups may or may not additionally contain Si-bonded hydroxyl groups.

The branched silicone resin can alternatively be a DT resin comprising T units as described above and D units of the formula R$_2$SiO$_{2/2}$, for example 20 to 80 mole %, preferably 50 to 80% T units and 20 to 80%, preferably 20 to 50%, D units of the formula R$^2$$_2$SiO$_{2/2}$, where R$^2$ represents a hydrocarbon group containing 1 to 8, more preferably 1 to 4, carbon atoms, particularly methyl.

The hydrocarbon groups in the T units of the branched silicone resin are most preferably selected from phenyl groups and alkyl groups having 3 to 8 carbon atoms, for example phenyl groups and/or propyl or octyl groups.

More than one type of branched hydroxyl-containing silicone resin can be used in the rubber compositions according to the invention. For example a T-resin as described above can be used in conjunction with a resin containing Q groups. The resin can if desired contain a silicone resin having no hydroxyl groups in addition to the resin containing hydroxyl groups.

It is preferred that the branched silicone resin should have no more than one OH group bonded to each silicon atom. The resin can in general have a hydroxyl content of 1 to 22% by weight OH groups bonded to silicon, calculated as the weight of such OH groups per weight resin. A phenyl T-resin consisting of silicone units of the formula (HOR"SiO$_{2/2}$) has 12.3% by weight OH groups bonded to silicon. A propyl resin consisting of units of the formula (HOR'SiO$_{2/2}$) has 16.3% OH groups bonded to silicon. More preferably, the branched silicone resin has a hydroxyl content of at least 3% by weight up to about 10% by weight. Most preferably the branched silicone resin has a hydroxyl content of 5 to 8% by weight OH groups bonded to silicon. We have found that branched silicone resins having a hydroxyl content in the range 5 to 8% by weight give the optimum balance of performance properties for use in tyres containing a hydroxyl-functional filler such as silica.

The branched silicone resin can be a solid or a liquid. It can for example be added to the rubber composition in solid form such as powder, flakes or pellets or carried on a substrate or in liquid form such as a pure liquid or a solution The branched silicone resin is preferably used at 0.2 to 10% based on the weight of organic elastomer in the curable rubber composition, more preferably at 0.5 to 5% by weight based on the elastomer content of the rubber composition.

The organic elastomer used in the rubber compositions of the invention is generally a diene elastomer, that is an elastomer resulting at least in part (i.e. a homopolymer or a copolymer) from diene monomers (monomers bearing two double carbon-carbon bonds, whether conjugated or not). Preferably the elastomer is an "essentially unsaturated" diene elastomer, that is a diene elastomer resulting at least in part from conjugated diene monomers, having a content of members or units of diene origin (conjugated dienes) which is greater than 15 mol %. More preferably it is a "highly unsaturated" diene elastomer having a content of units of diene origin (conjugated dienes) which is greater than 50%. Diene elastomers such as butyl rubbers or copolymers of dienes and of alpha-olefins of the ethylene-propylene diene monomer (EPDM) type, which may be described as "essentially saturated" diene elastomers having a low (less than 15%) content of units of diene origin, can alternatively be used.

The diene elastomer can for example be:

(a) any homopolymer obtained by polymerization of a conjugated diene monomer having 4 to 12 carbon atoms;
(b) any copolymer obtained by copolymerization of one or more dienes conjugated together or with one or more vinyl aromatic compounds having 8 to 20 carbon atoms;
(c) a ternary copolymer obtained by copolymerization of ethylene, of an [alpha]-olefin having 3 to 6 carbon atoms with a non-conjugated diene monomer having 6 to 12 carbon atoms, such as, for example, the elastomers obtained from ethylene, from propylene with a non-conjugated diene monomer of the aforementioned type, such as in particular 1,4-hexadiene, ethylidene norbornene or dicyclopentadiene;
(d) a copolymer of isobutene and isoprene (butyl rubber), and also the halogenated, in particular chlorinated or brominated, versions of this type of copolymer.

Suitable conjugated dienes are, in particular, 1,3-butadiene, 2-methyl-1,3-butadiene, 2,3-di(C$_1$-C$_5$ alkyl)-1,3-butadienes such as, for instance, 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene and 2,4-hexadiene. Suitable vinyl-aromatic compounds are, for example, styrene, ortho-, meta- and para-methylstyrene, the commercial mixture "vinyltoluene", para-tert.-butylstyrene, methoxystyrenes, chlorostyrenes, vinylmesitylene, divinylbenzene and vinylnaphthalene.

The copolymers may contain between 99% and 20% by weight of diene units and between 1% and 80% by weight of vinyl aromatic units. The elastomers may have any microstructure, which is a function of the polymerization conditions used, in particular of the presence or absence of a modifying and/or randomizing agent and the quantities of modifying and/or randomizing agent used. The elastomers may for example be block, statistical, sequential or microsequential elastomers, and may be prepared in dispersion or in solution; they may be coupled and/or starred or alternatively functionalized with a coupling and/or starring or functionalizing agent. Examples of preferred block copolymers are styrene-butadiene-styrene (SBS) block copolymers and styrene-ethylene/butadiene-styrene (SEBS) block copolymers.

Preferred are polybutadienes, and in particular those having a content of 1,2-units between 4% and 80%, or those having a content of cis-1,4 of more than 80%, polyisoprenes, butadiene-styrene copolymers, and in particular those having a styrene content of between 5% and 50% by weight and, more particularly, between 20% and 40%, a content of 1,2-bonds of the butadiene fraction of between 4% and 65%, and a content of trans-1,4 bonds of between 20% and 80%, butadiene-isoprene copolymers and in particular those having an isoprene content of between 5% and 90% by weight. In the case of butadiene-styrene-isoprene copolymers, those which are suitable are in particular those having a styrene content of between 5% and 50% by weight and, more particularly, between 10% and 40%, an isoprene content of between 15% and 60% by weight, and more particularly between 20% and 50%, a butadiene content of between 5% and 50% by weight, and more particularly between 20% and 40%, a content of 1,2-units of the butadiene fraction of between 4% and 85%, a content of trans-1,4 units of the butadiene fraction of between 6% and 80%, a content of 1,2- plus 3,4-units of the isoprene fraction of between 5% and 70%, and a content of trans-1,4 units of the isoprene fraction of between 10% and 50%.

The organic rubber can alternatively be natural rubber. We have found that a branched silicone resin containing azosilane groups has particular advantages in a curable filled natural rubber composition, as described above.

The curable rubber compositions of the invention are used in particular for a tread for a tyre, be it a new or a used tyre (case of recapping).

In the case of a passenger car tire, the elastomer is for example a Styrene Butadiene rubber (SBR), for example an SBR prepared in emulsion ("ESBR") or an SBR prepared in solution ("SSBR"), or an SBR/BR, SBR/NR (or SBR/IR), alternatively BR/NR (or BR/IR), or SIBR (isoprene-butadiene-styrene copolymers), IBR (isoprene-butadiene copolymers), or blends (mixtures) thereof. In the case of an SBR elastomer, in particular an SBR having a styrene content of between 20% and 30% by weight, a content of vinyl bonds of the butadiene fraction of between 15% and 65%, and a content of trans-1,4 bonds of between 15% and 75% Such an SBR copolymer, preferably an SSBR, is possibly used in a mixture with a polybutadiene (BR) having preferably more than 90% cis-1,4 bonds.

In the case of a tire for a heavy vehicle, the elastomer is in particular an isoprene elastomer; that is an isoprene homopolymer or copolymer, in other words a diene elastomer selected from the group consisting of natural rubber (NR), synthetic polyisoprenes (1R), the various isoprene copolymers or a mixture of these elastomers. Of the isoprene copolymers, mention will be made in particular of isobutene-isoprene copolymers (butyl rubber-IIR), isoprene-styrene copolymers (SIR), isoprene-butadiene copolymers (BIR) or isoprene-butadiene-styrene copolymers (SBIR). This isoprene elastomer is preferably natural rubber or a synthetic cis-1,4 polyisoprene; of these synthetic polyisoprenes, preferably polyisoprenes having a content (mole %) of cis-1,4 bonds greater than 90%, more preferably still greater than 98%, are used. For such a tire for a heavy vehicle, the elastomer may also be constituted, in its entirety or in part, of another highly unsaturated elastomer such as, for example, an SBR elastomer.

When the elastomer composition is for use as a tire sidewall, the elastomer may comprise at least one essentially saturated diene elastomer, in particular at least one EPDM copolymer, which may for example be used alone or in a mixture with one or more of the highly unsaturated diene elastomers.

The elastomer can be an alkoxysilane-terminated or tin coupled solution polymerization prepared elastomer.

The filler is preferably a reinforcing filler. Examples of reinforcing fillers are silica, silicic acid, carbon black, or a mineral oxide of aluminous type such as alumina trihydrate or an aluminium oxide-hydroxide, or a silicate such as an aluminosilicate, or a mixture of these different fillers For use in tyre manufacture, the elastomer composition should preferably contain a sufficient amount of such a reinforcing filler to contribute a reasonably high modulus and high resistance to tear. The combined weight of the silica, alumina, aluminosilicates and/or carbon black in the rubber composition is generally in the range 10 to 200% by weight based on the elastomer, preferably 30 to 100% by weight based on elastomer. For tire tread compositions the reinforcing filler content is more preferably from about 35 to about 90% by weight based on elastomer.

We have found that a branched silicone resin containing Si-bonded hydroxyl groups has advantages in a curable rubber composition comprising an organic elastomer filled with a filler containing hydroxyl groups, particularly in reducing the mixing energy required for processing the rubber composition and improving the performance properties of products formed by curing the rubber composition. Silicone resins containing hydroxyl (silanol) groups are commercially available, for example from Dow Corning Corporation. The hydroxyl-containing filler can for example be a mineral filler, particularly a reinforcing filler such as a silica or silicic acid filler, as used in white tire compositions, or a mineral oxide of aluminous type such as alumina trihydrate or an aluminium oxide-hydroxide, or a silicate such as an aluminosilicate, or a mixture of these different fillers.

The reinforcing filler can for example be any commonly employed siliceous filler used in rubber compounding applications, including pyrogenic or precipitated siliceous pigments or aluminosilicates. Precipitated silicas are preferred, for example those obtained by the acidification of a soluble silicate, e.g., sodium silicate.

The precipitated silica preferably has a BET surface area, as measured using nitrogen gas, in the range of about 20 to about 600, and more usually in a range of about 40 or 50 to about 300 square meters per gram. The BET method of measuring surface area is described in the Journal of the American Chemical Society, Volume 60, Page 304 (1930). The silica may also be typically characterized by having a dibutylphthalate (DBP) value in a range of about 100 to about 350, and more usually about 150 to about 300 cm3/100 g, measured as described in ASTM D2414.

The silica, and the alumina or aluminosilicate if used, preferably have a CTAB surface area in a range of about 100 to about 220 m2/g (ASTM D3849). The CTAB surface area is the external surface area as evaluated by cetyl trimethylammonium bromide with a pH of 9. The method is described in ASTM D 3849 for set up and evaluation. The CTAB surface area is a well known means for characterization of silica.

Various commercially available silicas may be considered for use in elastomer compositions in conjunction with the coupling agents of this invention such as, only for example herein, and without limitation, silicas commercially available from PPG Industries under the Hi-Sil trademark with designations Hi-Sil EZ150G, 210, 243, etc; silicas available from Rhodia with, for example, designations of Zeosil 1165MP, 1115MP, HRS 1200MP, silicas available from Degussa AG with, for example, designations VN3, Ultrasil 7000 and Ultrasil 7005, and silicas commercially available from Huber having, for example, a designation of Hubersil 8745 and Hubersil 8715. Treated precipitated silicas can be used, for example the aluminum-doped silicas described in EP-A-735088.

If alumina is used in the elastomer compositions of the invention, it can for example be natural aluminum oxide or synthetic aluminum oxide ($Al_2O_3$) prepared by controlled precipitation of aluminum hydroxide. The reinforcing alumina preferably has a BET surface area from 30 to 400 $m^2/g$, more preferably between 60 and 250 $m^2/g$, and an average particle size at most equal to 500 nm, more preferably at most equal to 200 nm. Examples of such reinforcing aluminas are the aluminas A125, CR125, D65CR from Baïkowski or the neutral, acidic, or basic $Al_2O_3$ that can be obtained from the Aldrich Chemical Company. Neutral alumina is preferred.

Examples of aluminosilicates which can be used in the elastomer compositions of the invention are Sepiolite, a natural aluminosilicate which might be obtained as PANSIL from Tolsa S. A., Toledo, Spain, and SILTEG, a synthetic aluminosilicate from Degussa GmbH.

The filler often contains hydroxyl groups. The hydroxyl-containing filler can be silica, talc, magnesium dihydroxide or calcium carbonate, or a natural organic filler such as cellulose fiber or starch. Mixtures of mineral and organic fillers can be used, as can mixtures of reinforcing and non-reinforcing fillers.

The curing agent for the elastomer is preferably a sulfur vulcanizing agent. Examples of suitable sulfur vulcanizing agents include, for example, elemental sulfur (free sulfur) or sulfur donating vulcanizing agents, for example, an amine disulfide, polymeric polysulfide or sulfur olefin adducts which are conventionally added in the final, productive, rubber composition mixing step. Preferably, in most cases, the sulfur vulcanizing agent is elemental sulfur. Sulfur vulcanizing agents are used in an amount ranging from about 0.4 to about 8% by weight based on elastomer, preferably 1.5 to about 3%, particularly 2 to 2.5%.

Accelerators are generally used to control the time and/or temperature required for vulcanization and to improve the properties of the vulcanized elastomer composition. In one embodiment, a single accelerator system may be used, i.e., primary accelerator. Conventionally and preferably, a primary accelerator(s) is used in total amounts ranging from about 0.5 to about 4% by weight based on elastomer, preferably about 0.8 to about 1.5%. In another embodiment, combinations of a primary and a secondary accelerator might be used with the secondary accelerator being used in smaller amounts of about 0.05 to about 3% in order to activate and to improve the properties of the vulcanizate. Delayed action accelerators may be used which are not affected by normal processing temperatures but produce a satisfactory cure at ordinary vulcanization temperatures. Vulcanization retarders can also be used. Suitable types of accelerators that may be used in the present invention are amines, disulfides, guanidines, thioureas, thiazoles, for example mercaptobenzothiazole, thiurams, sulfenamides, dithiocarbamates, thiocarbonates, and xanthates. Preferably, the primary accelerator is a sulfenamide. If a second accelerator is used, the secondary accelerator is preferably a guanidine, dithiocarbamate or thiuram compound.

The curable rubber composition preferably contain a coupling agent, for example a trialkoxy, dialkoxy or monoalkoxy silane coupling agent, particularly a sulfidosilane preferably a disulfane or tetrasulfane for example a bis(trialkoxysilylpropyl)disulfane or tetrasulfane or a bis(dialkoxymethylsilylpropyl)disulfane or tetrasulfane, or a bis(dimethylethoxysilylpropyl)oligosulfane as described in U.S. Pat. No. 5,684,171, a bis(dimethylhydroxysilylpropyl)polysulfane as described in U.S. Pat. No. B1 6,774,255, or a dimethylhydroxysilylpropyl dimethylalkoxysilylpropyl oligosulfane as described in WO-A-2007/061550. Mercapto and blocked mercaptosilanes can be used as well. Such a coupling agent promotes bonding of the filler to the organic elastomer, thus enhancing the physical properties of the filled elastomer. We have found that use of a branched silicone resin according to the invention in conjunction with such a coupling agent can reduce the mixing energy required for processing the rubber composition and improve the performance properties of products formed by curing the rubber composition compared to compositions containing the coupling agent with no silicone resin.

The rubber composition may contain an agent for covering the reinforcing filler such as a tetraalkoxysilane as tetraethoxysilane or an alkylalkoxysilane, particularly an alkyltriethoxysilane such as 1-octyltriethoxysilane or 1-hexadecyltriethoxysilane, a polyetherpolyol such as polyethylene glycol, an amine such as a trialkanolamine or a hydroxylated polyorganosiloxane such as a hydroxyl-terminated polydimethylsiloxane.

The rubber composition can be compounded by methods generally known in the rubber compounding art such as mixing the elastomer with curing agents, such as sulfur, activators, retarders and accelerators, and with various commonly-used additive materials such as processing additives, for example oils, resins including tackifying resins, silicas, and plasticizers, fillers, pigments, fatty acid, zinc oxide, waxes, antioxidants and antiozonants, heat stabilizers, UV stabilizers, dyes, pigments, extenders and peptizing agents.

Typical amounts of tackifier resins, if used, comprise about 0.5 to about 10% by weight based on elastomer, preferably 1 to 5%. Typical amounts of processing aids comprise about 1 to about 50% by weight based on elastomer. Such processing aids can include, for example, aromatic, naphthenic, and/or paraffinic processing oils.

Typical amounts of antioxidants comprise about 1 to about 5% by weight based on elastomer. Representative antioxidants may be, for example, diphenyl-p-phenylenediamine and others, for example those disclosed in The Vanderbilt Rubber Handbook (1978), Pages 344 through 346. Typical amounts of antiozonants also comprise about 1 to 5% by weight based on elastomer.

Typical amounts of fatty acids, if used, which can include stearic acid or zinc stearate, comprise about 0.1 to about 3% by weight based on elastomer. Typical amounts of zinc oxide comprise about 0 to about 5% by weight based on elastomer alternatively 0.1 to 5%.

Typical amounts of waxes comprise about 1 to about 5% by weight based on elastomer. Microcrystalline and/or crystalline waxes can be used.

Typical amounts of peptizers comprise about 0.1 to about 1% by weight based on elastomer. Typical peptizers may for example be pentachlorothiophenol or dibenzamidodiphenyl disulfide.

The rubber compositions are produced in suitable mixers, and can be produced using two successive preparation phases well-known to the person skilled in the art: a first phase of thermomechanical working or kneading (sometimes referred to as "non-productive" phase) at high temperature, up to a maximum temperature (Tmax) of between 110° C. and 190° C., preferably between 130° C. and 180° C., followed by a second phase of mechanical working (sometimes referred to as "productive" phase) at temperature, typically less than 110° C., for example between 40° C. and 100° C., during which productive phase the cross-linking or vulcanization system is incorporated.

At least the reinforcing filler, the branched silicone resin and the coupling agent are incorporated by kneading into the elastomer during the non-productive phase. These different base constituents are introduced into the mixer in any non productive step and are kneaded thermomechanically, in one or more steps, until a maximum temperature of between 110 and 190° C., preferably between 130 and 180° C., is reached.

By way of example, the first (non-productive) phase is effected in a single thermomechanical step during which in a first phase the reinforcing filler, the branched silicone resin, the coupling agent and the elastomer are mixed in a suitable mixer, such as a conventional internal mixer or extruder, then in a second phase, for example after one to two minutes' kneading, any complementary covering agents or processing agents and other various additives, with the exception of the vulcanization system, are introduced into the mixer. When the apparent density of the reinforcing inorganic filler is low (generally the case of silicas), it may be advantageous to divide the introduction thereof into two or more parts. The mixing time during first phase can be longer when disulfide silane is used and/or the resin can be added at the end of the first phase.

A second step of thermomechanical working may be added in this internal mixer, after the mixture has dropped and after intermediate cooling to a temperature preferably less than 100° C., with the aim of making the compositions undergo complementary thermomechanical treatment, in particular in order to improve further the dispersion, in the elastomeric matrix, of the reinforcing inorganic filler. The total duration of the kneading, in this non-productive phase, is preferably between 2 and 10 minutes.

After cooling of the mixture thus obtained, the vulcanization system is then incorporated at low temperature, typically on an external mixer such as an open mill, or alternatively on an internal mixer (Banbury type). The entire mixture is then mixed (productive phase) for several minutes, for example between 2 and 10 minutes.

The final composition thus obtained is then calendared, for example in the form of thin slabs (thickness of 2 to 3 mm) or thin sheets of rubber in order to measure its physical or mechanical properties, in particular for laboratory characterization, or alternatively extruded to form rubber profiled elements used directly, after cutting or assembling to the desired dimensions, as a semi-finished product for tires, in particular as treads, plies of carcass reinforcements, sidewalls, plies of radial carcass reinforcements, beads or chaffers, inner tubes or air light internal rubbers for tubeless tires.

The vulcanization (or curing) of the rubber product such as a tyre or tread is carried out in known manner at a temperature of preferably between 130 and 200° C., under pressure, for a sufficient time. The required time for vulcanization may vary for example between 5 and 90 minutes.

The invention is illustrated by the following Examples, in which parts and percentages are by weight.

In the Examples, rubber compositions were produced from the following materials:

SBR—styrene butadiene rubber sold by Lanxess Bayer under the trade mark BUNA@VSL 5025-0
BR—polybutadiene rubber sold by Bayer under the trade mark BUNA@CB 24
NR—Natural rubber, grade SMR 10, with a Mooney viscosity of about 60 MU to 90 MU
Oil—Processing oil Nytex 832 (trade mark) from Nynas
Silica—a hydroxyl-containing silica of type "HD" sold by Rhodia under the trade mark Zeosil 1165MP
TESPT—bis(triethoxysilylpropyl)tetrasulfane as e.g. sold by Dow Corning under the trade mark Z-6940
TESPD—bis(triethoxysilylpropyl)disulfane as e.g. sold by Dow Corning under the trade mark Z-6920
Resin 1—a silicone T-resin containing phenyl groups, with a hydroxyl content of 6 to 8% by weight and weight average molecular weight Mw 2660
Resin 2—a silicone T-resin containing propyl groups with a hydroxyl content of 6.5% by weight
Resin 3—a silicone T-resin containing phenyl groups and propyl groups in a ratio of about 7:3 with a hydroxyl content of 6.5% by weight, prepared as described in Example 1 of U.S. Pat. No. 5,173,290
Resin 4—a silicone DT-resin containing phenyl (Ph) and methyl (Me) groups of $D^{Me2}:D^{Ph2}:T^{Me}:T^{Ph}$ in a ratio of 3:1:2:14 with a hydroxyl content of 6% by weight
Resin 5—a silicone T-resin containing methyl (Me) and methoxy substituents on the silicon atom, no hydroxyl
Resin 6—a silicone T-resin containing phenyl (Ph) and methoxy, no hydroxyl
DPG—diphenylguanidine
SA—stearic acid
ZnO—zinc oxide
6PPD—N-1,3-dimethylbutyl-N-phenyl-para-phenylenediamine ("Santoflex 6-PPD" (trade mark) from Flexsys)
S—sulfur
CBS—N-cyclohexyl-2-benzothiazyl sulfonamide ("Santocure CBS" from Flexsys)

The mixing procedure was as follows for example from 1 to 10 and 14 to 17:

In a first step, SBR, BR, Oil, Silica, Z-6940 and the silicone resin (except for Examples 7, 8, 16, 17 and Comparative Examples 4 and 5) were introduced into an internal mixer (Banbury mixer) filled to 70%. The initial tank temperature was 80° C. Thermomechanical working (non productive phase) was then performed in two stages. The first stage proceeds until a maximum dropping temperature of about 160° C. is reached. The mixture was cooled to a temperature of 23° C.

In a second step, SA, ZnO and 6PPD were added. The torque level in the Banbury mixer was measured during mixing. Silicone resin was added at this stage for Examples 7, 8, 16, 17 and Comparative Examples 4 and 5.

In a third step (productive mixing), the samples were blended with the curing system of DPG, S and CBS in an internal rubber mixer for about 3 minutes.

The mixing procedure was as follows for example from 11 to 13 and comparative example 3:

In a first step, SBR, NR, Oil, Silica, Z-6940, SA, ZnO, 6PPD and the silicone resin were introduced into an internal mixer (Banbury mixer) filled to 70%. The initial tank temperature was 80° C. Addition time for silicone resin was different for each example to get to optimum performances. The first stage proceeds until a maximum drop temperature of about 160° C. is reached, and maximum temperature reached during mixing is about 175° C. Total mixing time was 8 minutes. The mixture was cooled to a temperature of 23° C.

In a second step (productive mixing), the samples were blended with the curing system of DPG, S and CBS in an internal rubber mixer for about 3 minutes.

The compositions thus obtained were calendared in the form of sheets of 2 to 3 mm before curing and molding 20 minutes at 160° C.

The testing procedures used in the Examples were as follows:

Mooney viscosity was measured in accordance with Standard ASTM D1646-03

The rheometry measurements were performed at 160° C. using an oscillating chamber rheometer in accordance with Standard ISO 3417:1991 (F). The change in rheometric torque over time describes the course of stiffening of the composition as a result of the vulcanization reaction. The measurements are processed in accordance with Standard ISO 3417:1991(F). Minimum and maximum torque values, measured in deciNewtonmeter (dNm) are respectively denoted ML and MH time at α% cure (for example 5%) is the time necessary to achieve conversion of α% (for example 5%) of the difference between the minimum and maximum torque values. The difference, denoted MH-ML, between minimum and maximum torque values is also measured. In the same conditions the scorching time for the rubber compositions at 160° C. is determined as being the time in minutes necessary to obtain an increase in the torque of 2 units, above the minimum value of the torque (Time@2 dNm scorch S').

The tensile tests were performed in accordance with ISO Standard ISO37:1994(F) using tensile specimen ISO 37—type 2. The nominal stress (or apparent stresses, in MPa) at 10% elongation (M10), 100% elongation (M100) and elongation (M250 or M300) are measured at 10%, 100% and 250% or 300% of elongation. Breaking stresses (in MPa) are also measured. Elongation at break (in %) was measured according to Standard ISO 37. High values of Elongation at break are preferred. Preferably the Elongation at break is at least 300%. All these tensile measurements are performed under normal conditions of temperature and relative humidity in accordance with ISO Standard ISO 471.

The dynamic properties were measured on a viscoanalyser (Metravib VA4000), in accordance with ASTM Standard D5992-96. The response of a sample of vulcanized composition (thickness of 2.5 mm and a cross-section of 40 mm2), subjected to an alternating single sinusoidal shearing stress, at a frequency of 10 Hz, under a controlled temperature of 55° C. is recorded. Scanning is performed at amplitude of deformation of 0.1 to 50% the maximum observed value of the loss factor tan is recorded, the value being denoted $\tan_{max}$. The $\tan_{max}$ value is well correlated to the rolling resistance of the tire. G'0 is the elastic modulus measured at very low strain, when the behaviour is linear with the stress. G'max is the elastic modulus at 50% strain. Dynamical properties have been recorded after a first strain sweep (G'0) from 0.1 to 50%, then the return from 50% to 0.1% has been also recorded. The difference between the modulus at first strain sweep and the modulus after the return to low strain (G'0 return) is denoted G'0 which is well correlated to the handling stability of the tire under stress. The difference between G'0 return and G'max after the second strain sweep is denoted G'return. The tan ( ) max return value corresponds to the maximum of the loss factor tan ( ) during the return strain sweep. Tan ( ) max and tan ( ) max return are well correlated to the rolling resistance of the tire The Shore A hardness was measured according to ASTM D2240-02b.

Results are discussed separately for each individual set of example and comparative examples as comparison is significant only when processing and testing conditions are the same.

EXAMPLES 1 TO 3

The compositions of Examples 1 to 3 had the formulations, in parts per hundred parts of rubber (phr), shown in Table 1 below.

TABLE 1

|  | Example 1 | Example 2 | Example 3 | Comparative Example 1 |
|---|---|---|---|---|
| SBR | 70.0 | 70.0 | 70.0 | 70.0 |
| BR | 30.0 | 30.0 | 30.0 | 30.0 |
| Oil | 30.0 | 30.0 | 30.0 | 30.0 |
| Silica | 80.0 | 80.0 | 80.0 | 80.0 |
| TESPT | 6.4 | 6.4 | 6.4 | 6.4 |
| Resin 1 | 1.0 |  |  |  |
| Resin 2 |  | 1.0 |  |  |
| Resin 3 |  |  | 1.0 |  |
| DPG | 1.5 | 1.5 | 1.5 | 1.5 |
| SA | 2.0 | 2.0 | 2.0 | 2.0 |
| ZnO | 2.5 | 2.5 | 2.5 | 2.5 |
| 6PPD | 1.9 | 1.9 | 1.9 | 1.9 |
| S | 1.1 | 1.1 | 1.1 | 1.1 |
| CBS | 2.0 | 2.0 | 2.0 | 2.0 |

The torque levels during mixing are shown in Table 2 below. In Table 2, $t_0$=time when the piston closes the mixing chamber after introduction of all products and subsequent times are in seconds after $t_0$.

TABLE 2

| | Torque (Nm) | | | | |
|---|---|---|---|---|---|
| time | $t_0$ | $t_{0+80\,s}$ | $t_{0+140\,s}$ | $t_{0+200\,s}$ | $t_{0+260\,s}$ |
| Comparative Example 1 | 7 | 236 | 210 | 197 | 177 |
| Example 1 | 7 | 188 | 172 | 171 | 162 |
| Example 2 | 12 | 158 | 150 | 136 | 125 |
| Example 3 | 8 | 173 | 160 | 154 | 157 |

The torque level is directly correlated to the energy used for the mixing. As Table 2 shows, the small amount of resin added is leading to a considerable decrease of the processing torque. It means that the energy required for the mixing is much lower in presence of these resins than for the reference formulation. The resins are acting as plasticizer agents and processing aids that can help to reduce the cost of processing.

The rubber compositions of Examples 1 to 3 had increased cure kinetics compared to the comparative example. The time required to reach a strain value corresponding to 95% of curing was between 12.7 and 12.8 minutes for each of Examples 1 to 3, whereas the comparative example took about 14.1 minutes to reach this strain value.

The physical properties of the cured rubber compositions are described in Table 3

TABLE 3

|  | Comparative Example 1 | Example 1 | Example 2 | Example 3 |
|---|---|---|---|---|
| Mooney Viscosity @100° C. | | | | |
| Mmax | 86 | 118 | 107 | 117 |
| ML1 + 4 | 66 | 88 | 81 | 86 |
| Rheometer @160° C. | | | | |
| ML (dNm) --> (S'@min (S')) | 2.4 | 3.2 | 2.9 | 3.1 |
| MH (dNm) --> (S'@max (S')) | 12.7 | 14.9 | 14.4 | 14.7 |
| MH − ML (dNm) | 10.3 | 11.7 | 11.5 | 11.6 |
| Time@5% cure S' (min) | 3.2 | 3.4 | 3.4 | 3.3 |
| Time@95% cure S' (min) | 14.1 | 12.7 | 12.8 | 12.8 |
| Time@2 dNm scorch S' (min) | 5.0 | 5.2 | 5.1 | 5.1 |
| Dynamic properties, strain sweep @55° C. | | | | |
| G'$_0$ (MPa) | 2.10 | 2.30 | 2.23 | 1.83 |
| G'$_{0\,return}$ (MPa) | 1.53 | 1.70 | 1.70 | 1.60 |
| G'max (MPa) | 0.97 | 1.07 | 1.10 | 1.07 |
| G' return (MPa) | 0.57 | 0.63 | 0.57 | 0.53 |
| G' 0 (MPa) | 0.57 | 0.60 | 0.57 | 0.23 |
| $\tan_{max}$ | 0.126 | 0.112 | 0.109 | 0.105 |
| $\tan_{max\,return}$ | 0.121 | 0.110 | 0.106 | 0.103 |
| Physical properties | | | | |
| M10 | 0.4 | 0.4 | 0.4 | 0.4 |
| M100 (MPa) | 2.1 | 2.8 | 2.8 | 2.8 |
| M250 (MPa) | 9.1 | 12.3 | 12.3 | 12.3 |
| Shore A | 53.4 | 56.8 | 55.6 | 56.7 |

The compositions of Examples 1, 2 and 3 containing the branched silicone resins have a strong increase of
MH-ML,
tensile modulus (stress at specified elongation)
hardness The OH containing resins have a significant effect on curing properties, usually, higher MH-ML indicates a higher crosslink density. The compositions of Examples 1 to 3 each exhibit MH-ML values of around 11.6 dNm, whereas the comparative example only reaches 10.3 dNm. The compositions of examples 1, 2 and 3 provide a higher crosslink density.

The tensile modulus and hardness obtained with these compositions are also significantly increased thanks to the OH-containing resin. This also shows that OH-containing resin provides a higher crosslink density.

In the viscoelastic properties, the handling stability indicator $G'_0$ showed no negative impact of the resin addition for compositions of Examples 1 and 2, For composition of Example 3, $G'_0$ is decreased by more than 50%, leading to a better stability of the tire performance after an application high stress. The amplitudes of $\tan_{max}$ and $\tan_{max\ return}$ are decreased significantly (up to 15%) for the compositions of Examples 1, 2 and 3, indicating a reduction in rolling resistance for tires made from these compositions.

Examples 1 to 3 show that addition of small amounts of the hydroxyl functional T-resins leads to higher compound performance in processing and mechanical properties.

EXAMPLE 4

A rubber composition was prepared in which 10 parts silica per 100 parts elastomer in Comparative Example 1 was replaced by 1 part of hydroxyl-containing silicone resin. The level of curing additives was also reduced to give the same cure kinetics, as shown by the formulation in parts per hundred parts rubber in Table 4 below.

TABLE 4

|  | Example 4 |
| --- | --- |
| SBR | 70.0 |
| BR | 30.0 |
| Oil | 30.0 |
| Silica | 70.0 |
| TESPT | 6.4 |
| Resin 1 | 1.0 |
| DPG | 1.5 |
| SA | 2.0 |
| ZnO | 2.5 |
| 6PPD | 1.9 |
| S | 1.1 |
| CBS | 1.6 |

The torque levels during mixing are shown in Table 5 below.

TABLE 5

| Torque (Nm) | | | | | |
| --- | --- | --- | --- | --- | --- |
|  | $t_0$ | $t_{0+80\ s}$ | $t_{0+140\ s}$ | $t_{0+200\ s}$ | $t_{0+260\ s}$ |
| Example 4 | 11 | 168 | 144 | 138 | 148 |

The torque levels in Example 4 were considerably lower than those in Comparative Example 1, showing that less energy was required for mixing.

The physical properties of the composition of Example 4 are shown in Table 6 below:

TABLE 6

|  | Example 4 |
| --- | --- |
| Mooney Viscosity @100° C. | |
| Mmax | 77 |
| ML1 + 4 | 65 |
| Rheometer @160° C. | |
| ML (dNm) --> (S'@min (S')) | 2.7 |
| MH (dNm) --> (S'@max (S') | 12.5 |
| MH − ML (dNm) | 9.8 |
| Time@5% cure S' (min) | 3.4 |
| Time@95% cure S' (min) | 15.7 |
| Time@2 dNm scorch S' (min) | 6.1 |
| Dynamic properties, strain sweep @55° C., simple shear | |
| $G'_0$ (MPa) | 2.03 |
| $G'_{0\ return}$ (MPa) | 1.57 |
| G'max (MPa) | 1.03 |
| G' return (MPa) | 0.46 |
| G' 0 (MPa) | 0.54 |
| $\tan_{max}$ | 0.114 |
| $\tan_{max\ return}$ | 0.112 |
| Physical properties | |
| M10 | 0.4 |
| M100 (MPa) | 2.3 |
| M300 (MPa) | 12.9 |
| Shore A | 52.6 |

The composition of Example 4 had closely similar cure kinetics and crosslink density to Comparative Example 1 as MH and MH-ML and Time@95% cure are showing.

Example 4 containing the branched silicone resin shows further advantages compared to Comparative Example 1:
  lower viscosity Mmax and ML1+4. When Mooney viscosity is decreased, the energy required to process when compounds are extruded is decreased.
  decrease of $\tan_{max}$ and $\tan_{max\ return}$, indicating improved rolling resistance of tyres made from the composition of Example 4.

Example 4 shows that replacement of part of the silica in a tyre tread formulation by a lower amount of hydroxyl-containing silicone resin can give a composition with improved rolling resistance and little change in other properties, with the added benefits of requiring a lower level of the expensive cure additives DPG and CBS and of lower processing energy during extrusion.

EXAMPLE 5

The composition of Comparative Example 1 was adjusted by reduction of the silica content and addition of a branched silicone resin. The level of curing additives was also reduced to give the same cure kinetics. The formulation is shown in parts by weight in Table 7 below. In Comparative Example 2, the silicone resin was replaced by an equal weight (2 phr) of the polyhedral oligomeric silsesquioxane (POSS) available commercially as POSS Trisilanol phenyl sold by Plastic Hybrids.

TABLE 7

|  | Example 5 | Comparative Example 2 |
| --- | --- | --- |
| SBR | 70.0 | 70.0 |
| BR | 30.0 | 30.0 |
| Oil | 30.0 | 30.0 |
| Silica | 70.0 | 70.0 |

TABLE 7-continued

|  | Example 5 | Comparative Example 2 |
|---|---|---|
| TESPT | 6.4 | 6.4 |
| Resin 1 | 2.0 | |
| POSS | | 2.0 |
| DPG | 1.1 | 1.1 |
| SA | 2.0 | 2.0 |
| ZnO | 2.5 | 2.5 |
| 6PPD | 1.9 | 1.9 |
| S | 1.1 | 1.1 |
| CBS | 1.4 | 1.4 |

The torque levels during mixing are shown in Table 8 below.

TABLE 8

| | Torque (Nm) | | | | |
|---|---|---|---|---|---|
| | $T_0$ | $t_{0+80\,s}$ | $T_{0+140\,s}$ | $t_{0+200\,s}$ | $t_{0+260\,s}$ |
| Example 5 | 2 | 141 | 124 | 125 | 132 |
| Comparative Example 2 | 2 | 145 | 133 | 138 | 155 |

The compositions of Example 5 and Comparative Example 2 each reduced the torque, and thus the energy required during processing, compared to Comparative Example 1, with Example 5 exhibiting a higher reduction compared to Comparative Example 2.

The physical properties of the two compositions are shown in Table 9 below

TABLE 9

|  | Example 5 | Comparative Example 2 |
|---|---|---|
| Mooney Viscosity @100° C. | | |
| Mmax | 116 | 135 |
| ML1 + 4 | 89 | 103 |
| Rheometer @160° C. | | |
| ML (dNm) --> (S'@min (S')) | 2.9 | 3.1 |
| MH (dNm) --> (S'@max (S')) | 13.1 | 13.3 |
| MH − ML (dNm) | 10.2 | 10.2 |
| Time@5% cure S' (min) | 3.4 | 3.4 |
| Time@95% cure S' (min) | 13.2 | 13.6 |
| Time@2 dNm scorch S' (min) | 6.0 | 6.2 |
| Dynamic properties, strain sweep @55° C., simple shear | | |
| G'$_0$ (MPa) | 1.83 | 2.40 |
| G'$_{0\,return}$ (MPa) | 1.60 | 1.93 |
| G'max (MPa) | 0.97 | 1.17 |
| G'$_{return}$ (MPa) | 0.63 | 0.77 |
| G'$_0$ (MPa) | 0.27 | 0.47 |
| tan$_{max}$ | 0.128 | 0.126 |
| tan$_{max\,return}$ | 0.128 | 0.126 |
| Physical properties | | |
| M10 | 0.4 | 0.4 |
| M100 (MPa) | 2.6 | 2.8 |
| M250 (MPa) | 11.4 | 11.7 |
| Shore A | 56 | 56 |

The comparison between Example 5 containing the OH-functional branched silicone resin with Comparative Example 2 containing POSS shows the following differences:
The Mooney viscosity Mmax and ML1+4 is lower for the resin than with POSS. Both mooney viscosities are helping to predict the workability of the rubber compounds during the profile extrusion. The higher Mmax will be the higher the torque energy required to start the extrusion will be. The higher ML1+4 will be, the higher the energy required to complete the profile extrusion will be. The comparison between POSS and OH-functional branched silicone resin lets predict a better workability and a lower processing energy for the OH-functional branched silicone resin.

Equivalent amplitude of tan$_{max}$.

A decrease of the difference between G'0 after the first strain sweep and the return. This difference is correlated to the performance stability of tires after high stress solicitations. The lower the difference is the better stability of tire performance will be.

Equivalent tensile modulus and hardness

Example 5 shows that replacement of part of the silica in a tyre tread formulation by a lower amount of hydroxyl-containing silicone resin can give a composition with improved processing characteristics and dynamic performances compared to replacement by POSS, and at a lower cost.

EXAMPLE 6

Example 5 was repeated replacing the T resin by silicone DT resin 4 as shown in Table 10.

TABLE 10

|  | Example 6 |
|---|---|
| SBR | 70.0 |
| BR | 30.0 |
| Oil | 30.0 |
| Silica | 70.0 |
| TESPT | 6.4 |
| Resin 4 | 2.0 |
| DPG | 1.1 |
| SA | 2.0 |
| ZnO | 2.5 |
| 6PPD | 1.9 |
| S | 1.1 |
| CBS | 1.4 |

The torque levels during mixing are shown in Table 11 below.

TABLE 11

| | Torque (Nm) | | | | |
|---|---|---|---|---|---|
| | $t_0$ | $t_{0+80\,s}$ | $T_{0+140\,s}$ | $t_{0+200\,s}$ | $t_{0+260\,s}$ |
| Example 6 | 4 | 157 | 141 | 144 | 174 |

The composition of Example 6 reduced the torque, and thus the energy required during processing, compared to Comparative Example 1, although the reduction in torque towards the end of mixing was less than in Example 5.

The physical properties of the composition of Example 6 are shown in Table 12 below

TABLE 12

|  | Example 6 |
|---|---|
| Mooney Viscosity @100° C. | |
| Mmax | 165 |
| ML1 + 4 | 133 |

TABLE 12-continued

|  | Example 6 |
|---|---|
| Rheometer @160° C. | |
| ML (dNm) --> (S'@min (S')) | 3.9 |
| MH (dNm) --> (S'@max (S') | 13.8 |
| MH − ML (dNm) | 9.9 |
| Time@5% cure S' (min) | 3.1 |
| Time@95% cure S' (min) | 14.8 |
| Time@2 dNm scorch S' (min) | 5.6 |
| Dynamic properties, strain sweep @55° C., simple shear | |
| $G'_0$ (MPa) | 2.13 |
| $G'_{0\,return}$ (MPa) | 1.73 |
| G'max (MPa) | 1.10 |
| $G'_{return}$ (MPa) | 0.63 |
| $G'_0$ (MPa) | 0.40 |
| $\tan_{max}$ | 0.124 |
| $\tan_{max\,return}$ | 0.121 |
| Physical properties | |
| M10 | 0.4 |
| M100 (MPa) | 2.8 |
| M250 (MPa) | 11.8 |
| Shore A | 53.7 |

The composition of Example 6 had closely similar cure kinetics and crosslink density to Example 5 and Comparative Example 1, as MH and MH-ML and Time@95% are showing The $G'_0$ is lower for Example 6 than for Comparative Example 1, indicating improved durability of properties.

The M100 and M250 Modulus are higher for example 6 than for comparative example 1.

Example 6 shows that the replacement of part of the silica in tyre tread formulation by a lower amount of OH-containing DT silicone resin can give a composition with improved modulus, and little changes in other properties, with the added benefits of requiring a lower level of the expensive cure additives DPG and CBS and a lower processing energy during extrusion.

EXAMPLES 7 TO 10

A rubber composition was prepared in which 10 parts silica per 100 parts elastomer in Comparative Example 1 was replaced by 1 part of hydroxyl-containing silicone T resin. The resin was added in the second mixing step for Examples 7 and 8 and in the first mixing step for Examples 9 and 10. Formulation composition in parts per hundred parts rubber is shown in Table 13 below.

TABLE 13

|  | Example 7 | Example 8 | Example 9 | Example 10 | Comparative Example 1 |
|---|---|---|---|---|---|
| SBR | 70.0 | 70.0 | 70.0 | 70.0 | 70.0 |
| BR | 30.0 | 30.0 | 30.0 | 30.0 | 30.0 |
| Oil | 30.0 | 30.0 | 30.0 | 30.0 | 30.0 |
| Silica | 70.0 | 70.0 | 70.0 | 70.0 | 80.0 |
| TESPT | 6.4 | 6.4 | 6.4 | 6.4 | 6.4 |
| Resin 1 | 1.0 | 2.0 | 1.0 | 2.0 | 0.0 |
| DPG | 1.5 | 1.5 | 1.5 | 1.5 | 1.5 |
| SA | 2.0 | 2.0 | 2.0 | 2.0 | 2.0 |
| ZnO | 2.5 | 2.5 | 2.5 | 2.5 | 2.5 |
| 6PPD | 1.9 | 1.9 | 1.9 | 1.9 | 1.9 |
| S | 1.1 | 1.1 | 1.1 | 1.1 | 1.1 |
| CBS | 2.0 | 1.8 | 2.0 | 1.8 | 2.0 |

The torque levels during mixing are shown in Table 14 below.

TABLE 14

| | Torque (Nm) | | | | |
|---|---|---|---|---|---|
|  | $t_0$ | $t_{0+80\,s}$ | $T_{0+140\,s}$ | $t_{0+200\,s}$ | $t_{0+260\,s}$ |
| Example 7 | 2 | 180 | 175 | 160 | 150 |
| Example 8 | 3 | 180 | 170 | 165 | 155 |
| Example 9 | 10 | 170 | 161 | 160 | 160 |
| Example 10 | 7 | 160 | 145 | 152 | 160 |
| Comparative Example 1 | 52 | 225 | 210 | 205 | 200 |

Example 7 to 10 led to similar torque level. Torque level at different time showed decrease of energy demand during mixing for example 7 to 10 compared to comparative example 1.

The physical properties of the composition of Example 7 to 10 and comparative example 1 are shown in Table 15 below:

TABLE 15

|  | Example 7 | Example 8 | Example 9 | Ex. 10 | Comparative Example 1 |
|---|---|---|---|---|---|
| Mooney Viscosity @100° C. | | | | | |
| Mmax | 80.7 | 92.2 | 99.5 | 113.4 | 77.8 |
| ML1 + 4 | 59.5 | 65.7 | 77.2 | 88.2 | 56.9 |
| Rheometer @160° C. | | | | | |
| ML (dNm) --> (S'@min(S')) | 1.86 | 2.03 | 2.49 | 2.78 | 1.8 |
| MH (dNm) --> (S'@max(S') | 13.89 | 13.96 | 14.85 | 15.46 | 13.61 |
| MH − ML (dNm) | 12.03 | 11.93 | 12.36 | 12.68 | 11.81 |
| Time@5% cure S' (min) | 3.84 | 3.86 | 3.41 | 3.32 | 3.11 |
| Time@95% cure S' (min) | 14.45 | 14.11 | 14.4 | 14.58 | 15.24 |
| Time@2 dNm scorch S' (min) | 5.89 | 5.54 | 5.52 | 5.26 | 4.92 |
| Dynamic properties, strain sweep @55° C., simple shear | | | | | |
| $G'_0$ (MPa) | 4.95 | 5.13 | 5.77 | 6.41 | 7.28 |
| $G'_{0\,return}$ (MPa) | 4.49 | 4.62 | 4.87 | 5.64 | 6.27 |
| G'max (MPa) | 2.83 | 2.93 | 3.1 | 3.4 | 2.85 |
| $G'_{return}$ (MPa) | 2.12 | 2.20 | 2.67 | 3.01 | 4.42 |
| $G'_0$ (MPa) | 0.46 | 0.51 | 0.9 | 0.46 | 1.01 |
| $\tan_{max}$ | 0.107 | 0.107 | 0.106 | 0.109 | 0.156 |
| $\tan_{max\,return}$ | 0.107 | 0.107 | 0.105 | 0.111 | 0.164 |
| Physical properties | | | | | |
| M10 | 0.48 | 0.47 | 0.5 | 0.5 | 0.52 |
| M100 (MPa) | 3.08 | 3.03 | 3.59 | 3.75 | 2.66 |
| M250 (MPa) | 12.91 | 12.81 | 15.3 | 15.35 | 10.22 |
| M300 (MPa) | 17.01 | 16.55 | — | — | 13.89 |
| Shore A | 50.3 | 50.4 | 51.6 | 53.0 | 50.8 |
| Elongation max (%) | 303 | 300 | 271 | 258 | 382 |

Examples 7 to 10 had closely similar cure kinetics towards Comparative Example 1 as shown by similar values of Time@95% cure. Crosslink density of Examples 7 to 10 was similar to the value obtained with Comparative Example 1, as shown by MH and MH-ML values.

The $G'_0$ is lower for Example 7 to 10, especially 7, 8 and 10, than for Comparative Example 1, indicated improved durability of properties.

The tan( ) maximum was lower for example 7 to 10 than for comparative example 1 indicating a lower rolling resistance of the final compound. This was believed to be due to the lower amount of silica in the composition (70 phr instead of 80).

The M100 and M300 Modulus were higher for example 7 to 10 than for comparative example 1.

Examples 7 to 10 showed that the replacement of part of the silica in tyre tread formulation by a lower amount of OH-containing T silicone resin can give a composition with improved modulus and lower tan( ) maximum, with little changes in other properties. Examples 8 and 10 had additional benefits of requiring a lower level of the expensive cure additives DPG.

Example 7 to 10 succeeded in lowering energy demand during processing as shown by torque level in table 14.

Example 7 to 10 also had a lower viscosity than for comparative example 1.

Elongation at break (Elong max) values for examples 7 and 8 were better than those for examples 9 and 10. It is believed that, for composition with low amount of silica (such as 70 phr), adding silicone resin 1 in the second step, is beneficial to improve elongation at break.

EXAMPLES 11 TO 13

A rubber composition was prepared in which 10 parts silica per 100 parts elastomer in Comparative Example 3 was replaced by 1 part of hydroxyl-containing silicone T resin. Example 11 to 13 differed from one another in the time for the addition of the silicone resin. Formulation composition in parts per hundred parts rubber is shown in Table 16 below.

TABLE 16

|  | Example 11 | Example 12 | Example 13 | Comparative Example 3 |
|---|---|---|---|---|
| SBR | 70.0 | 70.0 | 70.0 | 70.0 |
| NR | 30.0 | 30.0 | 30.0 | 30.0 |
| Oil | 30.0 | 30.0 | 30.0 | 30.0 |
| Silica | 70.0 | 70.0 | 70.0 | 80.0 |
| TESPD | 5.64 | 5.64 | 5.64 | 5.64 |
| Resin 1 | 1.0 | 1.0 | 1.0 | 0.0 |
| DPG | 1.4 | 1.4 | 1.4 | 1.5 |
| SA | 2.0 | 2.0 | 2.0 | 2.0 |
| ZnO | 2.5 | 2.5 | 2.5 | 2.5 |
| 6PPD | 1.9 | 1.9 | 1.9 | 1.9 |
| S | 1.7 | 1.7 | 1.7 | 1.7 |
| CBS | 1.8 | 1.8 | 1.8 | 2.0 |

The torque levels during mixing are shown in Table 17 below.

TABLE 17

| | Torque (Nm) | | | | |
|---|---|---|---|---|---|
| | $t_0$ | $t_{0+80 s}$ | $T_{0+200 s}$ | $t_{0+300 s}$ | $t_{0+400 s}$ |
| Example 11 | 70 | 200 | 135 | 115 | 121 |
| Example 12 | 80 | 200 | 170 | 125 | 121 |
| Example 13 | 71 | 200 | 135 | 115 | 121 |
| Comparative example 3 | 75 | 200 | 205 | 175 | 135 |

Example 11 to 13 led to similar torque level. Torque level at different time showed decrease of energy demand during mixing for example 11 to 13 compared to comparative example 3.

The physical properties of the composition of Example 11 to 13 and comparative example 1 are shown in Table 15 below:

TABLE 18

| | Comparative example 3 | example 11 | example 12 | example 13 |
|---|---|---|---|---|
| | Mooney Viscosity @100° C. | | | |
| Mmax | 73.2 | 71.5 | 65.2 | 65.6 |
| ML1 + 4 | 54.7 | 52.1 | 50.5 | 51.2 |
| | Rheometer @160° C. | | | |
| ML (dNm) | 1.79 | 1.67 | 1.55 | 1.57 |
| MH (dNm) | 12.47 | 13.03 | 11.62 | 12.74 |
| MH – ML (dNm) | 10.68 | 11.36 | 10.07 | 11.17 |
| Time@5% cure S' (min) | 4.07 | 4.76 | 4.22 | 4.7 |
| Time@95% cure S' (min) | 15.48 | 14.28 | 13.03 | 14.31 |
| Time@2 dNm scorch S' (min) | 6.04 | 6.04 | 5.29 | 6.08 |
| | Dynamic properties, strain sweep@55° C., simple shear, 10 Hz | | | |
| $G'_0$ (Pa) | 1.29 | 1.72 | 1.39 | 1.70 |
| $G'_{0\ return}$ (Pa) | 0.94 | 1.52 | 1.21 | 1.55 |
| $G'_0$ (Pa) | 0.356 | 0.195 | 0.189 | 0.147 |
| $G'_{max}$ | 0.55 | 0.88 | 0.82 | 0.85 |
| $G'$ (Pa) | 0.390 | 0.642 | 0.384 | 0.704 |
| tan max, 1st sweep | 0.134 | 0.133 | 0.111 | 0.136 |
| tan max, 2nd sweep | 0.132 | 0.129 | 0.107 | 0.136 |
| | Tensile properties | | | |
| M10 | 0.42 | 0.47 | 0.4 | 0.45 |
| M100 (MPa) | 2.71 | 3.12 | 2.8 | 2.91 |
| M300 (MPa) | 15.16 | 16.16 | 15.61 | 14.87 |
| M300/M100 | 5.59 | 5.18 | 5.58 | 5.11 |
| Stress@break (MPa) | 21.21 | 20.4 | 20.24 | 19.4 |
| Elong max (%) | 385.15 | 362.47 | 364.82 | 371.37 |
| Shore A | 55.6 | 58.4 | 53.1 | 55.9 |

Examples 11 to 13 had closely similar cure kinetics towards Comparative Example 3 as shown by similar values of Time@95% cure. Crosslink density of Examples 11 to 13 was similar to the value obtained with Comparative Example 3, as shown by MH and MH-ML values.

The $G'_0$ is lower for Example 11 to 13 than for Comparative Example 3, indicated improved durability of properties.

The tan( ) maximum was lower for example 12 than for comparative example 3, indicating a lower rolling resistance of the final compound. This was believed to be due to the lower amount of silica in the composition (70 phr instead of 80).

The M100 and M300 Modulus are higher for example 12 than for comparative example 3.

Examples 12 showed that the replacement of part of the silica in tyre tread formulation by a lower amount of OH-containing T silicone resin can give a composition with improved modulus and lower tan( ) maximum, with little changes in other properties. Examples 12 had additional benefits of requiring a lower level of the expensive cure additives DPG.

Example 11 to 13 succeeded in lowering energy demand during processing as shown by torque level in table 18.

Example 11 to 13 also had a lower viscosity than for comparative example 1.

EXAMPLES 14 AND 15

A rubber composition was prepared in which 10 parts silica per 100 parts elastomer in Comparative Example 3 was replaced by 1 part of hydroxyl-containing silicone T resin and 1.8 part of TESPT is replaced by 1 part of OH-containing T resin.

Formulation composition in parts per hundred parts rubber is shown in Table 19 below.

TABLE 19

|  | Comparative Example 1 | Example 14 | Example 15 |
|---|---|---|---|
| SBR | 70.0 | 70.0 | 70.0 |
| BR | 30.0 | 30.0 | 30.0 |
| Oil | 30.0 | 30.0 | 30.0 |
| Silica | 80.0 | 70.0 | 70.0 |
| TESPT | 6.4 | 4.6 | 6.4 |
| Resin 1 | 0.0 | 1.0 | 1.0 |
| Resin 2 | 0.0 | 1.0 | 0.0 |
| DPG | 1.5 | 1.4 | 1.4 |
| SA | 2.0 | 2.0 | 2.0 |
| ZnO | 2.5 | 2.5 | 2.5 |
| 6PPD | 1.9 | 1.9 | 1.9 |
| S | 1.1 | 1.1 | 1.1 |
| CBS | 2.0 | 1.8 | 1.8 |

The torque levels during mixing are shown in Table 20 below.

TABLE 20

| | Torque (Nm) | | | |
|---|---|---|---|---|
| | $t_0$ | $t_{0+80s}$ | $T_{0+200s}$ | $t_{0+300s}$ |
| Example 14 | 64.2 | 178.5 | 191.2 | 174.5 |
| Example 15 | 73.1 | 172.6 | 172.6 | 159.9 |
| Comparative example 1 | 69.3 | 203.9 | 222.5 | 200.3 |

Torque level at different time showed decrease of energy demand during mixing for example 15 compared to comparative example 1.

The physical properties of the composition of Example 14 and 15 and comparative example 1 are shown in Table 21 below:

TABLE 21

|  | comparative example 1 | example 14 | example 15 |
|---|---|---|---|
| Mooney Viscosity @100° C. | | | |
| Mmax | 75.7 | 74.2 | 65.6 |
| ML1 + 4 | 58.1 | 57.6 | 52.7 |
| Rheometer @160° C. | | | |
| ML (dNm) | 2.07 | 1.9 | 1.66 |
| MH (dNm) | 13.79 | 14.72 | 13.99 |
| MH − ML (dNm) | 11.72 | 12.82 | 12.33 |
| Time@5% cure S' (min) | 3.1 | 4.35 | 3.82 |
| Time@95% cure S' (min) | 14.08 | 14.24 | 14.31 |
| Time@2 dNm scorch S' (min) | 4.63 | 6.25 | 5.89 |
| Dynamic properties, strain sweep @55° C., simple shear | | | |
| $G'_0$ (Pa) | 2.38 | 1.95 | 2.12 |
| $G'_{0\,return}$ (Pa) | 2.03 | 1.77 | 1.79 |
| $G'_0$ (Pa) | 0.345 | 0.185 | 0.334 |
| $G'_{max}$ | 0.946 | 1.009 | 0.931 |
| $G'_{return}$ (Pa) | 1.085 | 0.760 | 0.858 |
| Max tan (Pa) | 0.163 | 0.120 | 0.134 |
| Max tan g return | 0.166 | 0.118 | 0.137 |
| Physical properties | | | |
| M10 | 0.5 | 0.51 | 0.52 |
| M100 (MPa) | 2.49 | 3.03 | 2.92 |
| M250 (Mpa) | 9.48 | 12 | 11.29 |
| M300 (MPa) | 12.9 | 15.81 | 14.98 |
| M250/M100 | 3.81 | 3.96 | 3.87 |
| M300/M100 | 5.18 | 5.22 | 5.13 |
| Tensile break (MPa) | 19.2 | 18.36 | 17.97 |
| Elong max (%) | 398.67 | 336.93 | 343.38 |
| Shore A | 52.1 | 56.4 | 55.5 |

Examples 14 and 15 had closely similar cure kinetics towards Comparative Example 1 as shown by similar values of Time@95% cure. Crosslink density of Examples 14 and 15 was similar to the value obtained with Comparative Example 1, as shown by MH and MH-ML values.

The $G'_0$ is lower for Example 14 than for Comparative Example 1 and for example 15, indicated improved durability of properties.

The tan( ) maximum was lower for example 14 than for comparative example 1 and example 15 indicating a lower rolling resistance of the final compound. This was believed to be due to the lower amount of silica in the composition (70 phr instead of 80) and also to second resin that play the role of surface modifier as referred in patent US20060217473A1.

The M100 and M300 Modulus are higher for example 14 than for comparative example 1 and example 15.

Examples 14 and 15 were a part of the silica in tyre tread formulation was replaced by OH-containing T silicone resin, showed improved modulus and lower tan( ) maximum, with little changes in other properties over reference.

Example 14 showed benefit over example 15 and reference by replacing part of the silica and the silane using a lower amount of OH-containing T silicone resin with lower tan(d) maximum under strain, with little changes in other properties.

Example 14 and 15 succeeded in lowering energy demand during processing as shown by torque level in table 20.

Example 14 and 15 also had a lower viscosity than for comparative example 1.

EXAMPLE 16 AND COMPARATIVE EXAMPLES 4 AND 5

A rubber composition was prepared in which 10 parts silica per 100 parts elastomer in Comparative Example 3 was replaced by 1 part of hydroxyl-containing silicone T resin or alkoxy-containing silicone T resin.

TABLE 22

|  | Comparative example 1 | Example 16 | Comparative example 4 | Comparative example 5 |
|---|---|---|---|---|
| SBR | 70 | 70.0 | 70.0 | 70.0 |
| BR | 30 | 30.0 | 30.0 | 30.0 |
| Oil | 30 | 30.0 | 30.0 | 30.0 |
| Silica | 80 | 70.0 | 70.0 | 70.0 |
| TESPT | 6.4 | 6.4 | 6.4 | 6.4 |
| Resin 1 | 0.0 | 1.0 | 0.0 | 0.0 |
| Resin 5 | 0.0 | 0.0 | 1.0 | 0.0 |
| Resin 6 | 0.0 | 0.0 | 0.0 | 1.0 |
| DPG | 1.5 | 1.3 | 1.3 | 1.3 |
| SA | 2.0 | 2.0 | 2.0 | 2.0 |
| ZnO | 2.5 | 2.5 | 2.5 | 2.5 |
| 6PPD | 1.9 | 1.9 | 1.9 | 1.9 |
| S | 1.1 | 1.1 | 1.1 | 1.1 |
| CBS | 2.0 | 1.9 | 1.9 | 1.9 |

The torque levels during mixing are shown in Table 23 below.

TABLE 23

| | Torque (Nm) | | | |
|---|---|---|---|---|
| | $t_0$ | $t_{0+80\,s}$ | $T_{0+200\,s}$ | $t_{0+300\,s}$ |
| Example 16 | 64.2 | 178.5 | 191.2 | 174.5 |
| Example 17 | 78.2 | 174.5 | 172.3 | 165.3 |
| Example 18 | 69.9 | 174.7 | 193.1 | 161.1 |
| Comparative Example 1 | 69.3 | 203.9 | 222.5 | 200.3 |

Example 16 to 18 led to similar torque level. Torque level at different time showed decrease of energy demand during mixing for example compared to comparative example 1.

The physical properties of the composition of Example 16, Comparative Examples 4 and 5 and comparative example 1 are shown in Table 24 below:

TABLE 24

| | Comparative example 1 | example 16 | Comparative Example 4 | Comparative example 5 |
|---|---|---|---|---|
| Mooney Viscosity @100° C. | | | | |
| Mmax | 75.7 | 65.6 | 67.6 | 65.7 |
| ML1 + 4 | 58.1 | 52.7 | 52.7 | 50.0 |
| Rheometer @160° C. | | | | |
| ML (dNm) | 2.07 | 1.66 | 1.7 | 2.41 |
| MH (dNm) | 13.79 | 13.99 | 15.24 | 14.54 |
| MH − ML (dNm) | 11.72 | 12.33 | 13.54 | 12.95 |
| Time@5% cure S' (min) | 3.1 | 3.82 | 3.71 | 3.84 |
| Time@95% cure S' (min) | 14.08 | 14.31 | 14.02 | 14.14 |
| Time@2 dNm scorch S' (min) | 4.63 | 5.89 | 5.58 | 5.74 |
| Dynamic properties, strain sweep@55° C., simple shear, 10 Hz | | | | |
| G'₀ (Pa) | 2.38 | 2.12 | 2.40 | 2.41 |
| G'₀ return (Pa) | 2.03 | 1.79 | 1.84 | 2.12 |
| G'₀ (Pa) | 0.345 | 0.334 | 0.559 | 0.290 |
| G'max | 0.946 | 0.931 | 0.804 | 0.999 |
| G' (Pa) | 1.085 | 0.858 | 1.037 | 1.118 |
| tan max, 1st sweep | 0.163 | 0.134 | 0.145 | 0.146 |
| tan max, 2nd sweep | 0.166 | 0.137 | 0.157 | 0.150 |
| Tensile properties | | | | |
| M10 | 0.5 | 0.52 | 0.55 | 0.54 |
| M100 (MPa) | 2.49 | 2.92 | 2.93 | 2.94 |
| M300 (MPa) | 12.9 | 14.98 | 14.24 | 14.6 |
| M300/M100 | 5.18 | 5.13 | 4.86 | 4.97 |
| Stress@break (MPa) | 19.2 | 17.97 | 18.21 | 19.54 |
| Elong max (%) | 398.67 | 343.38 | 361.6 | 379.07 |
| Shore A | 52.1 | 55.5 | 58.2 | 58.5 |

Examples 16 and Comparative Examples 4 and 5 had closely similar cure kinetics towards Comparative Example 1 as shown by similar values of Time@95% cure. Crosslink density of Examples 16 and Comparative Examples 4 and 5 was similar to the value obtained with Comparative Example 1, as shown by MH and MH-ML values.

The tan( ) maximum was lower for example 16 than for comparative example 1 and Comparative examples 4 and 5, indicating a lower rolling resistance of the final compound. This showed the clear advantage of using hydroxyl terminated resin versus alkoxy terminated resins. Comparative Examples 4 and 5 were the rubber composition contains alkoxy terminated resins with no hydroxyl terminations.

The M100 and M300 Modulus are higher for example 16 than for comparative example 1 and Comparative examples 4 and 5. The ratio M300/M100 is comparable for example 16 and comparative example 1. This ratio is higher for example 16 than Comparative Example 4 and 5 leading to improved wear performance for example 16.

Examples 16 showed that the replacement of part of the silica in tyre tread formulation by a lower amount of OH-containing T silicone resin can give a composition with improved modulus and lower tan( ) maximum, with little changes in other properties.

EXAMPLE 17 AND COMPARATIVE EXAMPLES 6 AND 7

A rubber composition was prepared in which 1 part TESPT per 100 parts elastomer in Comparative Example 1 was replaced by 1 part of hydroxyl-containing silicone T resin in Example 17 or alkoxy-containing silicone T resin for Comparative examples 6 and 7. A rubber composition was prepared in which 10 parts silica per 100 parts elastomer in Comparative Example 1 was replaced by 1 part of resin 1 for example 17.

TABLE 25

| | Comparative example 1 | Example 17 | Comparative Example 6 | Comparative Example 7 |
|---|---|---|---|---|
| SBR | 70 | 70 | 70.0 | 70.0 |
| BR | 30 | 30 | 30.0 | 30.0 |
| Oil | 30 | 30 | 30.0 | 30.0 |
| Silica | 80 | 70 | 80.0 | 80.0 |
| TESPT | 6.4 | 6.4 | 5.4 | 5.4 |
| Resin 1 | 0.0 | 1.0 | 0.0 | 0.0 |
| Resin 2 | 0.0 | 0.0 | 0.0 | 0.0 |
| Resin 5 | 0.0 | 0.0 | 1.0 | 0.0 |
| Resin 6 | 0.0 | 0.0 | 0.0 | 1.0 |
| DPG | 1.5 | 1.3 | 1.5 | 1.5 |
| SA | 2.0 | 2.0 | 2.0 | 2.0 |
| ZnO | 2.5 | 2.5 | 2.5 | 2.5 |
| 6PPD | 1.9 | 1.9 | 1.9 | 1.9 |
| S | 1.1 | 1.1 | 1.32 | 1.32 |
| CBS | 2.0 | 1.9 | 2.0 | 2.0 |

The torque levels during mixing are shown in Table 26 below.

TABLE 26

| | Torque (Nm) | | | |
|---|---|---|---|---|
| | $t_0$ | $t_{0+80\,s}$ | $T_{0+200\,s}$ | $t_{0+300\,s}$ |
| Comparative Example | 58.4 | 209.4 | 204.7 | 201.7 |
| Comparative Example 7 | 76.3 | 182.2 | 206.3 | 187.7 |
| Example 17 | 85.2 | 197.9 | 186.4 | 155.8 |
| Comparative Example 1 | 74.9 | 220.5 | 210.9 | 210.6 |

Comparative examples 6 and 7 led to similar torque level. Torque level at different time showed decrease of energy demand during mixing compared to comparative example 1 but higher than in Example 17. This shows advantage of replacing silica using resin 1 over silane replacement with alkoxy siloxane compounds.

The physical properties of the composition of Comparative Examples 6 and 7 and comparative example 1 Example 17 are shown in Table 27 below:

TABLE 27

|  | Comparative example 1 | Comparative Example 6 | Comparative example 7 | Example 17 |
|---|---|---|---|---|
| Mmax | 86.0 | 86.1 | 89.0 | 96.7 |
| ML1 + 4 | 62.9 | 63.4 | 64.0 | 68.6 |
| ML (dNm) | 2.04 | 2.11 | 2.09 | 2.11 |
| MH (dNm) | 11.9 | 13.91 | 13.53 | 12.25 |
| MH − ML (dNm) | 9.86 | 11.8 | 11.44 | 10.14 |
| Time@5% cure S' (min) | 3.1 | 3.3 | 3.63 | 3.69 |
| Time@95% cure S' (min) | 15.23 | 14.37 | 14.84 | 15.27 |
| Time@2 dNm scorch S' (min) | 5.48 | 5.32 | 5.93 | 6.74 |
| $G'_0$ (Pa) | 1.96 | 2.32 | 2.02 | 1.65 |
| $G'_{0\ return}$ (Pa) | 1.73 | 1.97 | 1.73 | 1.46 |
| $G'_0$ (Pa) | 0.233 | 0.354 | 0.288 | 0.192 |
| $G'_{max}$ | 0.896 | 0.924 | 0.922 | 0.953 |
| G' (Pa) | 1.067 | 1.401 | 1.094 | 0.699 |
| 6% tan (Pa) | 0.158 | 0.156 | 0.150 | 0.113 |
| 6% tan d return | 0.158 | 0.165 | 0.145 | 0.109 |
| M10 | 0.45 | 0.5 | 0.48 | 0.43 |
| M100 (MPa) | 2.29 | 2.73 | 2.8 | 2.86 |
| M250 (Mpa) | 8.65 | 10.68 | 11.35 | 11.97 |
| M300 (MPa) | 11.84 | 14.31 | 15.18 | 16.02 |
| M250/M100 | 3.78 | 3.91 | 4.05 | 4.19 |
| M300/M100 | 5.17 | 5.24 | 5.42 | 5.60 |
| Tensile break (MPa) | 18.55 | 18.63 | 17.84 | 16.26 |
| Elong max (%) | 405.11 | 363.27 | 341.6 | 305.04 |
| Shore A | 55.3 | 58.3 | 57.7 | 55.4 |

Comparative examples 6 and 7 had closely similar cure kinetics towards Comparative Example 1 as shown by similar values of Time@95% cure. Crosslink density of comparative Examples 6 and 7 is higher than for comparative example 1 and Example 1, as shown by MH and MH-ML values. For those skilled in the art, an increase in crosslinking density should decrease tan( ) under strain condition as well as increased M300.

The tan( ) maximum was lower for example 17 than for comparative example 1 and comparative examples 6 and 7, indicating a lower rolling resistance of the final compound. This showed the clear advantage of using hydroxyl terminated resin as silica replacement versus alkoxy terminated ones as silane replacement.

The M100 and M300 Modulus are higher for example 17 than for comparative example 1 and comparative examples 6 and 7 indicating improved wear performance for example 17. This showed the clear advantage of using hydroxyl terminated resin as silica replacement versus alkoxy terminated ones as silane replacement.

All results showed in table 27 showed clear advantage in replacing silica using resin 1, as shown by example 17, compared to silane replacement as shown by comparative examples 6 and 7.

The invention claimed is:

1. A curable rubber composition comprising an organic elastomer, a filler and at least one curing agent for the elastomer, characterised in that the composition contains a branched silicone resin having from 3 to 10% Si-bonded hydroxyl groups by weight of the branched silicone resin or azo groups.

2. A composition according to claim 1, characterized in that the branched silicone resin has from 5 to 10% Si-bonded hydroxyl groups by weight of the branched silicone resin.

3. A composition according to claim 1, characterized in that the majority of the siloxane units in the branched silicone resin are T units of the form $RSiO_{3/2}$, in which the groups R, which can be different in different siloxane units, are selected from hydroxyl, hydrocarbon, substituted hydrocarbon, hydrocarbonoxy, and substituted hydrocarbonoxy groups.

4. A composition according to claim 3, characterized in that the branched silicone resin comprises units of the formula $R'SiO_{3/2}$, in which each R' represents an alkyl or substituted alkyl group, and units of the formula $HOR'SiO_{2/2}$.

5. A composition according to claim 4, characterized in that each R' represents a propyl group.

6. A composition according to claim 4, characterized in that the branched silicone resin comprises units of the formula $R'SiO_{3/2}$ in which R' represents a substituted alkyl group containing a reactive group selected from vinyl, epoxy, methacryloyl, mercapto and maleimido groups.

7. A composition according to claim 3, characterized in that the branched silicone resin comprises units of the formula $R''SiO_{3/2}$, in which each R'' represents an aryl group, and units of the formula $HOR''SiO_{2/2}$.

8. A composition according to claim 1, characterized in that the majority of the siloxane units in the branched silicone resin are T units of the form $RSiO_{3/2}$, in which the groups R, which can be different in different siloxane units, are selected from hydroxyl, hydrocarbon, substituted hydrocarbon, hydrocarbonoxy, and substituted hydrocarbonoxy groups, and the branched silicone resin comprises units of the formula $R'SiO_{3/2}$ in which R' represents a substituted alkyl group containing an —R*—$S_a$—R*—$SiX_3$ group forming a polysulfide linkage, wherein each R* represents an alkylene linkage having 2 to 18 carbon atoms, each X represents a hydroxyl, hydrocarbon, substituted hydrocarbon, hydrocarbonoxy or substituted hydrocarbonoxy group or an $O_{1/2}$ linkage, and a has an average value of 2 to 10.

9. A composition according to claim 1, characterized in that the filler is silica.

10. A composition according to claim 1, characterized in that the filler is selected from starch, cellulose, talc, alumina, and calcium carbonate.

11. A composition according to claim 1, characterized in that the composition also contains a sulfidosilane coupling agent to improve the bonding of the filler to the cured elastomer.

12. A composition according to claim 1, characterized in that the branched silicone resin is used at 0.2 to 10% based on the weight of organic elastomer in the curable rubber composition.

13. A composition according to claim 12, characterized in that the branched silicone resin is used at 1 to 5% based on the weight of organic elastomer in the curable rubber composition.

14. A composition according to claim 1, characterized in that the branched silicone resin contains Si-bonded hydroxyl groups and the filler contains hydroxyl groups.

* * * * *